United States Patent [19]

Cohen

[11] Patent Number: 4,975,294

[45] Date of Patent: Dec. 4, 1990

[54] PROCESS FOR MAKING A RESTRUCTURED MEAT PRODUCT

[76] Inventor: Morton R. Cohen, 117 Hart Rd., Cherry Hill, N.J. 08034

[21] Appl. No.: 303,022

[22] Filed: Jan. 26, 1989

Related U.S. Application Data

[63] Continuation of Ser. No. 117,359, Oct. 27, 1987, abandoned, which is a continuation of Ser. No. 790,633, Oct. 23, 1985, abandoned, which is a continuation of Ser. No. 595,318, Mar. 30, 1984, abandoned.

[51] Int. Cl.$^5$ .......................... A23L 1/31; A23L 1/317
[52] U.S. Cl. .................................... 426/272; 426/513; 426/518; 426/641
[58] Field of Search .............. 426/272, 641, 513, 516, 426/518, 519; 17/45

[56] References Cited

U.S. PATENT DOCUMENTS

| | | | |
|---|---|---|---|
| 2,673,156 | 3/1954 | Minder | 426/513 |
| 3,075,843 | 1/1963 | Maas et al. | |
| 3,563,764 | 2/1971 | Posegate | |
| 3,679,434 | 7/1972 | Bard et al. | |
| 3,845,227 | 10/1974 | Shults et al. | 426/266 |
| 4,072,763 | 2/1978 | Mart | 426/513 |
| 4,210,677 | 7/1980 | Huffman, I | 426/272 |
| 4,258,068 | 3/1981 | Huffman | 426/272 |
| 4,287,218 | 9/1981 | Rich et al. | 426/272 |
| 4,356,206 | 10/1982 | Boldt | 426/519 |
| 4,377,597 | 3/1983 | Shapiro et al. | 426/92 |
| 4,409,704 | 10/1983 | Seiffhart | 426/519 X |

OTHER PUBLICATIONS

Brochure entitled "Bettcher Sliced-N-Tact Model BH15".

Primary Examiner—Arthur L. Corbin
Attorney, Agent, or Firm—Weiser & Stapler

[57] ABSTRACT

Raw meat is sliced into wafer-thin slices having coarse and irregular surfaces and fibrils protruding therefrom. The slices are intertangled with each other through the fibrils to form a cohesive mass which is then formed into a restructured meat product. A restructured meat product which is a cohesive mass of meat slices is also disclosed.

42 Claims, 1 Drawing Sheet

U.S. Patent   Dec. 4, 1990   4,975,294
FIG. 1 (PRIOR ART)
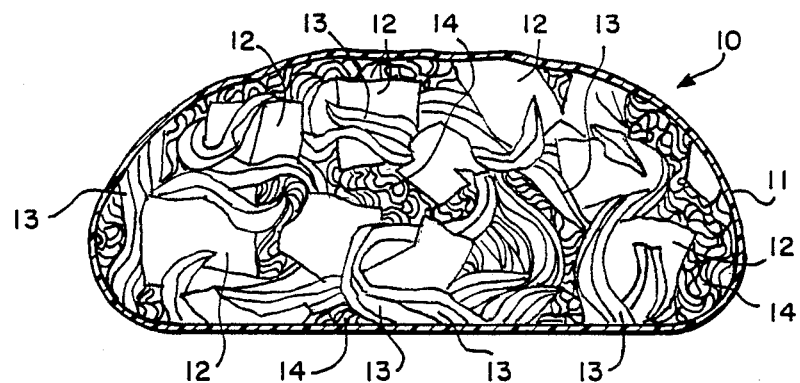
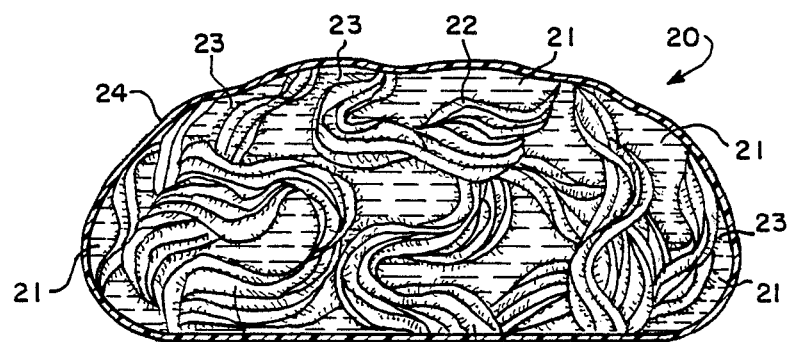
FIG. 2
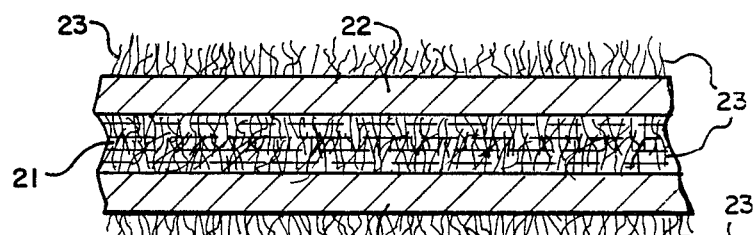
FIG. 3

PROCESS FOR MAKING A RESTRUCTURED MEAT PRODUCT

This application is a continuation of application Ser. No. 117,359, filed Oct. 27, 1987, now abandoned, which is a continuation, of application Ser. No. 790,633, filed Oct. 23, 1985, now abandoned, which is a continuation, of application Ser. No. 595,318, filed Mar. 30, 1984, now abandoned.

BACKGROUND OF THE INVENTION

The present invention relates to meat products, and more particularly to restructured meat products to be cooked and a method of making that product.

Attempts have been made so as to provide the hotel-restaurant-institutional and retail industries with proportion cuts of beef and pork that are uniform in size, shape, weight, density and have the desired sensory attributes including texture, tenderness, juiciness and flavor. That is, the food processing industry desires meat products having uniform size and quality so that a specific image for a product has a given cost where all material can be projected.

To satisfy the increased demand for meat while fulfilling the requirements imposed on meat production by grain and roughage constraints, several processes have been developed. Among these processes is the flake-cutting of meat and restructuring the resulting flaked meat into steak-like items. These flaked and formed steaks and chops have received some degree of acceptance. However, these items more closely resemble ground products in appearance, bite and texture than sectioned and formed steaks or chops.

U.S. Pat. No. 4,377,597 of Shapiro et al discloses a restructured meat product for cooking which comprises a mixture of lean meat chunks and elongated thin strips of lean meat which are interspersed between and intertwined about the chunks. The strips cooperate with myosin on the surface of the meat to form a product which can be shaped. However, the thus formed product still requires the presence of a salt in order to obtain sufficient myosin to achieve proper binding. The presence of chunks detracts from its appearance and causes non-uniformity in bite characteristics.

In Huffman, U.S. Pat. No. 4,210,677, a method is disclosed for preparing a restructured meat product from mechanically tenderized prefrozen chunks and thinly sliced meat. An essential step of the Huffman process is the mechanical tenderization, preferably four times, of meat chunks. Such mechanical working breaks apart the meat so that the end product is similar to ground meat.

Other prior art teachings relate to the processing of meat in which pieces of chunks of uncooked whole, unground meat are cured, and subjected to a form of mechanical working to partially grind the meat so that the pieces of meat become soft and pliable with a tacky exudate formed on the surface thereof. However, the tenderizing of such pieces of meat is not performed with a mechanical tenderizer, but is performed using chemicals such as salt and phosphates, or the like, and such chemical treatment is undesirable for many reasons. Such reasons include prohibition of use by persons on salt-free diets, reduction of all flavor, rancidity, and the like.

SUMMARY OF THE INVENTION

It is an object of the present invention to provide boneless, ready-to-cook formed meat products of bovine, porcine, ovine or avian species.

It is a further object of the present invention to provide a formed meat product which, when cooked, produces a product having an appearance, a flavor and a texture which closely resembles a steak, chop, or other cut of meat product.

It is a still further object of the present invention to provide a formed meat product which does not require use of chemicals, such as salt and phosphates or the like, to bring out myosin protein and to improve the flavor, texture, tenderness and the like.

It is another object of the invention to provide an intermediate meat product which can be further processed as desired and which possesses excellent binding and adhesion of its meat components.

It is a yet still further object of the present invention to provide a formed meat product which remains "fresh" as opposed to meat being cured or pre-cooked before forming.

It is also an object of the present invention to provide a process for preparing a formed meat product which, when roasted and sliced, closely resembles, in appearance, taste, and bite, the product obtained when a natural solid muscle is roasted and sliced.

In accordance with the present invention, thinly sliced meat is mechanically tenderized and caused to have matted or coarse surfaces while slicing and then further processed to be formed into steaks and chops. The raw materials are not ground, so that the final product looks like and has the bite more of muscle meat than ground or flaked and formed products.

In the process, fresh or chilled meat is sliced wafer-thin, to a thickness of less than about 10 mm. During the slicing operation, the slices are subjected to friction and/or vibration so as to affect the surface character of the slices. That is, the surface becomes coarse or matted because the meat fibers are caused to protrude. Slicing the meat across the grain provides a more desired effect. The meat is then placed in a mixing device such as a double-action mixer or other commonly used device such as a massager or tumbler. The mixing or massaging is for a period of 2 to 10 minutes at a temperature in which ice crystals do not form, depending upon the type of meat utilized. During the mixing or massaging, the myosin protein, which is principally myosin, actin and actomyosin, is further released. The myosin protein serves as the binding agent in the forming of the final product. Slicing fresh meat wafer-thin, that is less than about 10 mm, under conditions where the meat fibers are caused to protrude enables the meat to bind better together due to the larger exposed meat area surface and the intertwining of the fibers, but in addition provides a greater amount of myosin protein to be available during the forming process so that salts, enzymes or other chemicals are not required to obtain suitable binding.

It is an essential feature of the invention that during the slicing, the blade is caused to vibrate and produce an irregular surface on the slices, that is, wherein the meat fibrils extend out of the meat surface. Cutting against the grain of the meat brings out more of the fibers. An increase in the amount of fibrils on the meat surface of more than 20 percent than regularly sliced meat has been found to be desirable. Fibrils extending over more than 50% of the wafer's surface is particularly desirable. The vibration is found to increase the amount of available myosin protein and simultaneously tenderize the meat. It has also been found advantageous to increase the amount of friction in the meat surface during the cutting. The additional friction also assists in bringing out the myosin protein to form a matted surface. Later in the process, the matted surface of one wafer-thin slice is intertwined with the matted surface of the other slices so that there is no flaking-off after cooking as a result of the binding with myosin and the intertwining of fibrils. The combination of vibration and/or friction further produces mechanical tenderization of the meat wafers so that chemical tenderizers are not required. The wafer-sliced intra- and intermuscular fat is in such a form that it can be evenly dispersed throughout the product during the mixing process.

In order to eliminate voids or air-pockets in the final product, the meat pieces are optionally passed under vacuum and then into an extruding chamber. One form of extruding chamber which may be utilized is described in U.S. Pat. No. 3,563,764 of Russell W. Posegate, which is herein incorporated by reference. The meat is then extruded into a plastic sheet or tube or onto a conveyor or into a forming device.

The encased product may be placed under a pressure such as flat rolling or pressing depending upon the meat and formed into a desired shape and frozen. The pressure is usually applied so as to avoid bleed out and is preferably 250–500 psi.

Alternatively, the product may be extruded onto a forming device wherein it is pressure formed to a desired shape and frozen.

The use of only elongated wafer-thin strips without any chunks helps bind the product together securely even upon cooking. This is probably due to the fact that the thin strips provide a larger outer surface area for the extraction and the accumulation of the myosin protein. In addition, there is an intertwining of the fibers which are present because of the manner in which the meat is sliced. The combination results in a double binding action.

The restructured meat product is usually packaged in a plastic bag, preferably a virgin polyethylene bag of about 2.5 mil. However, other packaging materials including cellulose casings may be used. If the product is to be cooked in the bag, it is packaged in a relatively high density polyethylene bag which can withstand the temperatures and pressures encountered in cooking.

In the preferred method of the present invention, the wafer-thin meat slices are massaged for about 5 minutes to extract additional myosin protein. The resulting mixture is then extruded under vacuum into a plastic bag, preferably using a conventional stuffing machine to obtain an actual roast-shaped unit preferably weighing about 10 pounds. It appears that the mixing and stuffing operation both assists in dispersing and in intertwining the strips about each other.

The restructured meat products in the present invention may be frozen and supplied, either pre-cooked or uncooked. The uncooked product is packaged in a suitable plastic roasting bag, preferably high density polyethylene, and sliced while frozen to form steak-like products.

The process embodying the teachings of the present invention broadly includes the steps of:

(1) slicing meat into wafers of a thickness of less than about 10 mm, (2) Simultaneously with the slicing, subjecting the slices to a vibration so as to cause a rough or matted surfaces on the meat wafers during the slicing, (3) Increasing the friction on the meat wafer and the meat slice so as to bring out myosin protein, and then (4) Tumbling or massaging the meat wafers at a temperature at which ice crystals do not form for a period of time that the wafers intertwine and do not break or tear apart.

The product which is obtained after step 4 provides the essential meat mass which can then be processed by other known methods to form a desired meat product. For example, the product of step 4 may then be extruded, formed and frozen. The extruding step has been found to be helpful in eliminating voids and binding the wafers together because of the application of pressure in the extending nozzle.

Other objects and advantages of the present invention will be apparent to those skilled in the art from the description and drawing which follows.

BRIEF DESCRIPTION OF THE DRAWING

FIG. 1 is a cross-sectional sketch showing a prior cut of restructured meat product prior to roasting;

FIG. 2 is a cross-sectional sketch showing the restructured meat product of the invention prior to roasting, and FIG. 3 is an illustration of the intertwined meat fibrils produced in the invention.

DESCRIPTION OF THE PREFERRED EMBODIMENTS

Referring now to FIG. 1 of the drawing, it can be seen that the restructured beef product of the prior art, which is generally referred to by the numeral 10, is in a plastic bag 11 and includes a plurality of irregular shaped chunks of lean beef 12 having interspersed between and intertwined about them a plurality of thin elongated strips of lean beef 13. The remainder of the internal volume or space of the bag 11 is substantially filled with a mixture of a chopped beef and fat binder.

Referring now to FIG. 2, it can be seen that the preferred restructured beef product of the present invention, which is generally referred to by the numeral 20, is in a plastic bag 24 and includes a plurality of lean beef wafers which have fibrils 23 protruding and intertwined about each other with their fibrils interlaced. The internal volume or space of the bag is substantially filled with the meat wafers together with the myosin protein 21.

FIG. 3 illustrates the co-action of the intermeshed fibrils of the meat wafers 22 with the myosin protein 21 which provides the double-binding effect contemplated by the present invention so that the product achieves the desired texture and bite of solid muscle meat after cooking.

The restructured product of the present invention does not require the use of additional binders or chemicals to bring out myosin protein. However, chemicals, seasonings and flavoring aids may be added if desired without detracting from the objectives of the present invention. Although not required, chopped meat and fat can be added up to 25% of the lean meat as used in the prior art. While the product will possess more favorable bite, texture and appearance characteristics than similar prior art restructured products, it is preferred not to employ the additional filler materials if a natural muscle meat characteristic is desired.

It is possible in the invention to utilize raw material from the same or different species of animal or from different meat cuts depending upon the flavor and appearance in the final product. In a beef product, both top round and chunks have been used to produce the wafer slices to manufacture beef roasts, chops and steaks.

It is further noted that restructured products can also be made using boneless chicken and turkey meat alone or combined. For a turkey product, the process includes the steps of providing boneless breast muscles that have been trimmed free of skin and connective tissue. The meat is sliced into wafers and massaged for about 2 minutes. During mixing additives and flavorants can be added. The meat is then passed into an extruder and extruded into a casing.

As mentioned above, the restructured products of the present invention have excellent appearance, bite and taste characteristics. However, the process can be further refined by using additives, extenders, various storage times, mixing times, cooking procedures, and raw materials prepared without departing from the teaching of the present invention.

The practice of the method of the present invention will be further illustrated by the example which follows.

EXAMPLE 10 pounds of fresh trimmed beef sirloin steak tails about 3"×8"×3" were sliced into 1.5 mm wafers utilizing a multi-bladed, reciprocating, high-speed slicer of Bettcher sold under the name "Slice-N-Tact", which is described in their brochure "Slice-N-Tact Model BH15" published 1980, which is incorporated herein by reference. The slicing was conducted against the grain of the meat so that a large amount of friction was generated on both sides of the slices together with sufficient vibration to tear the surface of the slices so that the exposed fibers would be set up. The meat slices after the cutting were quite "tacky" as a result of the extraction of the myosin protein, and free of ice crystals.

The mass of individual slices was then placed into a tumbling device and tumbled for 5 minutes at a temperature of about 32° C. In the resulting product, the individual slices had become intertwined with the exposed fibers becoming knitted together so that the integrity of the individual slices was lost.

The meat was then passed over a vacuum means in order to draw out additional myosin, and placed into an extruder. The resulting mass was then extruded into 2.5 mil virgin polyethlene plastic bag and sealed.

The product was then rolled to a thickness of about 1 inch. The rolling or pressing step helps to eliminate air pockets so as to improve the texture of the product after cooking. Rolling the product further helps to elongate the fibers and align them in a single direction so that the appearance of the product is more like a natural muscle. The product after it was cooked resembled a natural roast. It was extremely difficult to detect that the product comprised a multiplicity of slices. The cooked product was tender, did not flake and had a natural bite.

Although in the foregoing example the restructured product described was a beef product, it will be appreciated that other sources of the lean meat may be used, including poultry, pork, veal and the like.

The restructured meat products of the invention may be cooked by any conventional method such as boiling, broiling, frying, with infra-red radiation, and the like, and will have the characteristics of cooked muscle meat.

In view of the modifications and changes that can be made, it is to be understood that the invention is not to be limited by description, but only by the claims which follow.

I claim:

1. An accelerated process for preparing a restructured meat product from raw meat, the restructured meat product having the appearance, flavor, bite and texture of natural solid muscle meat and being devoid of meat chunks, said process consisting of:
   (a) vibrationally and frictionally slicing the raw meat only into wafer-thin slices of less than about 10 mm in thickness, thereby forming coarse and irregular surfaces on said slices and exposing fibrils from said surfaces of the slices;
   (b) thoroughly only intertangling said slices with each other only through the fibrils of the slices thereby forming a thoroughly tangled cohesive mass of meat, securely bound, constituted only of meat slices which are not identifiable as single discrete slices, and then
   (c) forming the tangled mass into a restructured meat product of desired shape.

2. A restructured meat product made according to the process of claim 1.

3. The process of claim 1, wherein step (a) is performed by slicing the meat across the grain.

4. A restructured meat product made according to the process of claim 3.

5. The process of claim 3, wherein the intertangling is performed at a temperature sufficiently high to avoid formation of ice crystals.

6. The process of claim 5 wherein the slices are intertangled in a multi-planar, non-stacked alignment.

7. The process of claim 6 wherein the slices are intertangled for about two to less then ten minutes.

8. The process of claim 7, wherein the meat slices are intertangled for about five minutes.

9. The product of process claim 3 which, after step (c), is cooked and does not flake.

10. The product claim of 9 which is frozen after cooking.

11. The process of claim 1, wherein the slices are sliced to a thickness of about 1.5 mm.

12. The process of claim 11 wherein the slices are sliced into slices having dimensions of about 3 inches wide, 8 inches long and 1.5 mm thick.

13. The process of claim 12 wherein the slices are intertangled for about two to less than ten minutes.

14. The process of claim 1 which comprises the step of extruding the mass of meat into an extruded product prior to step (c).

15. The process of claim 14 wherein the extrusion is carried out under a vacuum.

16. The process of claim 15, wherein the restructured meat product is formed by pressing the extruded meat product.

17. The process of claim 1, wherein the restructured meat product is formed under pressure.

18. The process of claim 17, wherein the pressure is between about 250 and 500 psi.

19. The process of claim 1, wherein the restructured meat product is made without the addition of chemicals, phosphates, enzymes or salts.

20. The process of claim 1, wherein other ingredients selected from the group consisting of additives, extenders, raw materials, seasonings, flavoring aids or chemicals are added to the restructured meat product.

21. The process of claim 1, wherein fat is added up to 25% of the lean meat present in the starting raw meat.

22. The process of claim 1 wherein the slicing is performed by a plurality of reciprocating and frictional cutting means.

23. The process of claim 22 wherein the slices are intertangled for about two to less than ten minutes in step (b).

24. The process of claim 23 wherein the intertangling is performed at a temperature sufficiently high to avoid formation of ice crystals in step (b).

25. The process of claim 24 wherein step (c) is performed by rolling the meat product and thereby elongating and aligning the fibers in a single direction for promoting the likeness of the product to natural meat muscle.

26. A restructured meat product made according to the process of claim 23.

27. A restructured meat product made according to the process of claim 22.

28. The process of claim 1 wherein the meat is selected from the group consisting of beef, poultry, pork and veal.

29. The product of process claim 1 which, after step (c), is cooked and does not flake.

30. The product of claim 29 which is frozen after cooking.

31. An improved restructured meat product from raw meat having the flavor, appearance, bite and texture of natural solid muscle meat consisting of a cohesive mass of meat slices devoid of meat chunks, said mass having folded, twisted slices wrapped around each other and intertangled in a multiplanar, non-stacked arrangement in which the slices are not individually identifiable as single discrete slices and in which the slices have coarse and matted irregular surfaces exposing fibrils therefrom, said mass being held together and securely bound by the intertangling of the slices and intermeshing of fibrils.

32. The restructured meat of claim 31, which is a pressure-formed product.

33. The restructured meat product of claim 31, which is an extruded void-free product.

34. The restructured meat product of claim 33, wherein the extruded product is pressed to elongate and align the meat fibers.

35. The restructured meat product of claim 31, wherein the slices have a thickness of less than about ten millimeters.

36. The restructured meat product of claim 31, wherein the slices have a thickness of about 1.5 millimeters.

37. The restructured meat product of claim 31, which contains fat in an amount up to 25% of the meat.

38. The restructured meat product of claim 37, wherein the fat is evenly dispersed throughout the mass of meat.

39. The restructured meat product of claim 31, wherein the meat product is free from chemicals, phosphates, enzymes or salts.

40. The restructured meat product of claim 31, which comprises other ingredients selected from the group consisting of additives, extenders, raw materials, seasonings, flavoring aids or chemicals.

41. The restructured meat product of claim 31, which is a cooked product.

42. The product of claim 31 which is a mixture of meat of different species of animal.

* * * * *